United States Patent [19]

Melas

[11] Patent Number: 5,857,002
[45] Date of Patent: Jan. 5, 1999

[54] PRML CHANNEL WITH EPR4 EQUALIZATION AND CLOCKING

[75] Inventor: Constantin Michael Melas, Los Gatos, Calif.

[73] Assignee: International Business Machines Corporation, Armonk, N.Y.

[21] Appl. No.: 698,637

[22] Filed: Aug. 16, 1996

[51] Int. Cl.[6] .............................. H04L 25/34; H04L 25/49
[52] U.S. Cl. .......................... 375/290; 375/262; 375/263
[58] Field of Search ..................................... 375/290, 262, 375/263; 348/608; 360/53, 31

[56] References Cited

U.S. PATENT DOCUMENTS

| | | | |
|---|---|---|---|
| 4,013,980 | 3/1977 | Schollmeier | 333/18 |
| 4,504,872 | 3/1985 | Peterson | 360/40 |
| 4,614,933 | 9/1986 | Yamashita et al. | 340/347 |
| 4,866,736 | 9/1989 | Bergmans | 375/18 |
| 4,888,775 | 12/1989 | Karabed et al. | 371/43 |
| 5,093,843 | 3/1992 | Hirosaki et al. | 375/18 |
| 5,208,816 | 5/1993 | Seshardi et al. | 317/43 |
| 5,263,052 | 11/1993 | Borth et al. | 375/39 |
| 5,341,386 | 8/1994 | Shimoda et al. | 371/43 |
| 5,355,376 | 10/1994 | Cox et al. | 371/43 |
| 5,434,886 | 7/1995 | Kazawa et al. | 375/262 |
| 5,521,945 | 5/1996 | Knudson | 375/341 |
| 5,581,568 | 12/1996 | Togami | 371/43 |
| 5,619,539 | 4/1997 | Coker et al. | 375/341 |
| 5,661,760 | 8/1997 | Patapoutian et al. | 375/341 |
| 5,677,802 | 10/1997 | Saiki et al. | 360/51 |
| 5,689,532 | 11/1997 | Fitzpatrick | 375/341 |
| 5,696,793 | 12/1997 | Hashimura | 375/294 |

FOREIGN PATENT DOCUMENTS

| | | |
|---|---|---|
| 6177771 | 6/1994 | Japan . |
| 6267203 | 9/1994 | Japan . |
| 6282943 | 10/1994 | Japan . |

OTHER PUBLICATIONS

A.M. Patel and H.K. Thapar, Class Of Partial Response Systems for Increasing Storage Density In Magnetic Recording, IBM Technical Disclosure Bulletin, vol. 32, No. #B, Aug. 1989.

*Primary Examiner*—Stephen Chin
*Assistant Examiner*—Mohammad Ghayour
*Attorney, Agent, or Firm*—Morgan & Finnegan LLP

[57] ABSTRACT

A method and apparatus for decoding a partial response encoded signal to generate a decoded signal. The first stage of the apparatus, a first delay filter, receives the partial response encoded signal and filters it with a delay characteristic of $(1-D^2)(1+D)$. The second stage, a timing system, generates a digital signal representative of the first filtered signal. The timing system includes an equalizer with an EPR4 equalization characteristic. The third stage, a second delay filter, filters the signal with a delay characteristic of $1-D$. The final stage, a partial Viterbi decoder, generates the decoded signal.

6 Claims, 6 Drawing Sheets

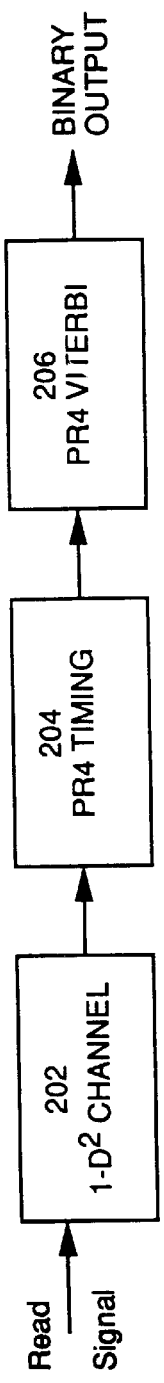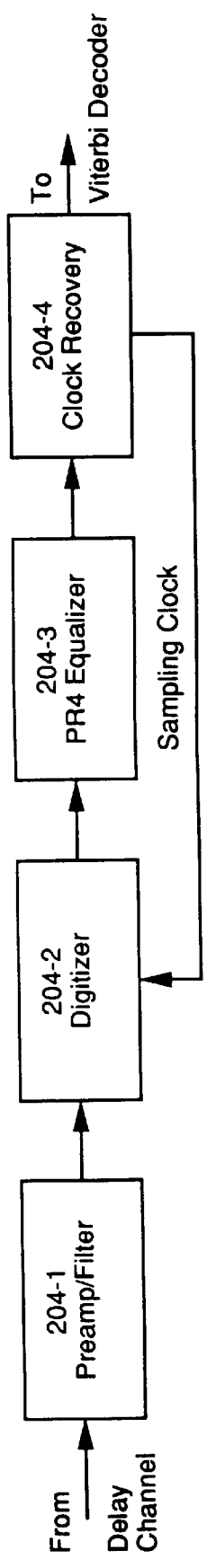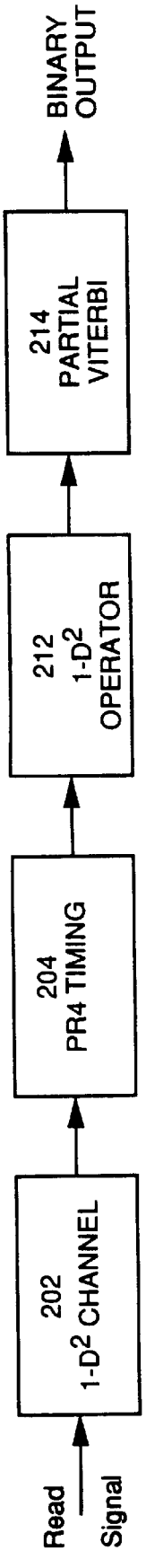

PRML CHANNEL WITH EPR4 EQUALIZATION AND CLOCKING

FIELD OF THE INVENTION

The present invention relates to decoding in partial response signaling and in particular to decoding a partial response maximum likelihood channel with extended partial response class 4 equalization and clocking.

BACKGROUND OF THE INVENTION

Digital communication channels are used in a variety of applications. One area of advancement is in increasing the amount of data which can be encoded into a channel of a given bandwidth. When applied to tape or disk drives, increasing the channel data rate while keeping the bandwidth constant produces a corresponding increase in the linear density of recorded data. However, a problem arises as the channel data rate increases while bandwidth is held constant: individual symbols spread so much that they interfere with sample values of adjacent intervals.

One way to deal with intersymbol interference is to purposely introduce a prescribed amount of intersymbol interference which is accounted for in the detection circuitry. One such technique is the well-known Partial Response (PR) signaling. In PR signaling, channel filters limit the spectrum so that the main part of each pulse extends across more than one signal interval and contributes to more than one sample time. A particular arrangement of PR signaling, in which the pulse is exactly three clock periods wide at its base, is known as PR Class 4 (PR4).

Problems arise with PR4 detection channels at high linear densities. Such channels require a great deal of equalizer boost. This requires the use of an expensive and complex multi-stage equalizer having considerable power consumption. For example, in some integrated decoding channels, the equalizer may use as much as half of the chip power dissipation. In addition, such equalization amplifies the noise in the channel, which may result in unreliable clocking.

SUMMARY OF THE INVENTION

The present invention is a method and apparatus for decoding a partial response encoded signal to generate a decoded signal. The first stage of the apparatus, a first delay filter, receives the partial response encoded signal and filters it with a delay characteristic of $(1-D^2)(1+D)$. The second stage, a timing system, generates a digital signal representative of the first filtered signal. The third stage, a second delay filter, filters the signal with a delay characteristic of $1-D$. The final stage, a partial Viterbi decoder, generates the decoded signal.

The timing system includes an equalizer with an EPR4 equalization characteristic. This equalizer is much simpler than that required for PR4 equalization. This results in reduced cost, complexity and circuit size, as well as greatly reduced power consumption. In addition, the gentler EPR4 characteristic results in less amplification of the noise in the channel.

BRIEF DESCRIPTION OF THE DRAWINGS

The details of the present invention, both as to its structure and operation, can best be understood by referring to the accompanying drawings, in which like reference numbers and designations refer to like elements.

FIG. 2a is a block diagram of a prior art PR4 decoding system.

FIG. 2b is a block diagram of a prior art PR4 timing system, which is one component of the PR4 decoding system of FIG. 2a.

FIG. 2c is a block diagram of a prior art PR4 decoding system.

DETAILED DESCRIPTION OF THE INVENTION

In order to describe the properties of partial response systems, a delay operator D is defined. D represents a delay equal to one signal interval T. Two units of delay is denoted as $D^2$. PR4 signaling is denoted $1-D^2$. The output represents the superposition of the input with a delayed version of the same input. In this case, the output represents the input superposed with a version of the input delayed by two signal intervals T and having its sign changed.

Another arrangement of PR signaling is Extended Partial Response Class 4 (EPR4) signaling. EPR4 signaling is denoted $1-D$. The output represents the input superposed with a version of the input delayed by one signal interval T.

Figure 1:
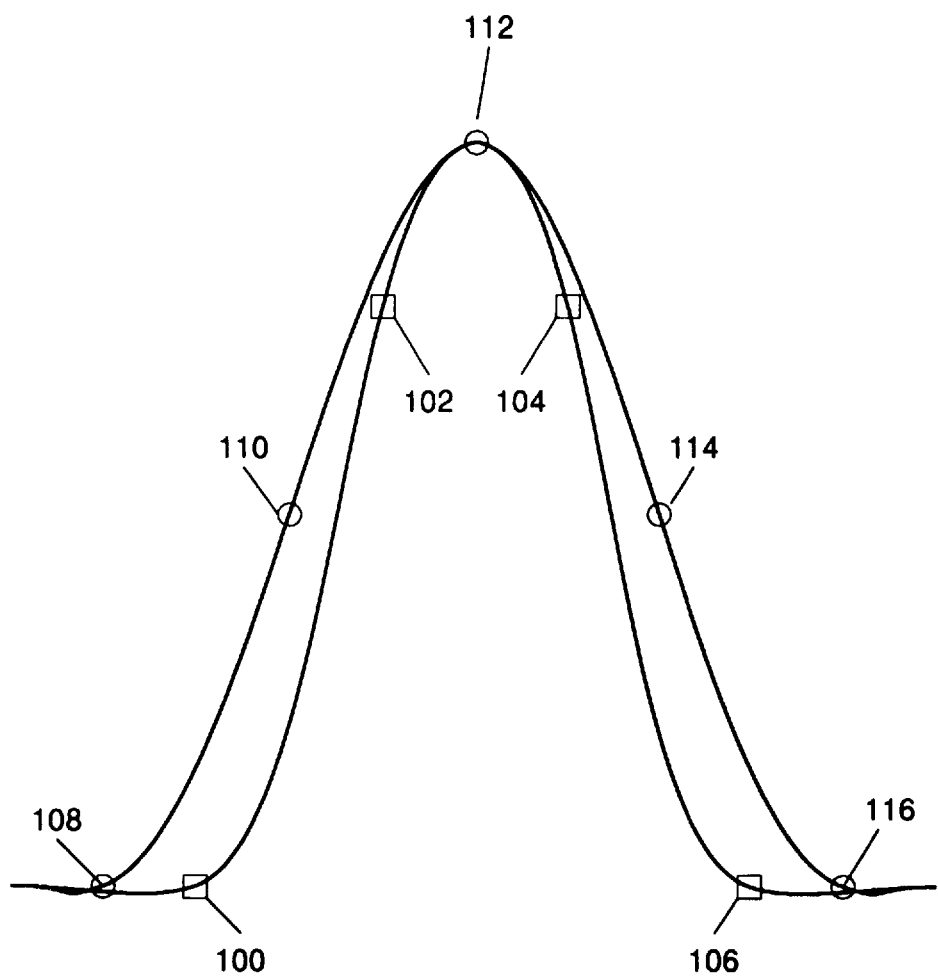
FIG. 1 is a diagram of a pulse with PR4 and EPR4 sampling.

FIG. 1 shows an analog pulse read from a tape or disk drive which has been equalized for PR4 decoding being sampled with PR4 sampling, and the same pulse equalized for EPR4 decoding being sampled with EPR4 sampling. The EPR4 equalized pulse is broader than the PR4 equalized pulse. In terms of PR4 sampling, the pulse is exactly three clock periods wide at its base and includes four samples, samples 100, 102, 104 and 106. The samples which are used for decoding, samples 102 and 104, are at about 78% of the amplitude of the pulse, where it is one clock period wide. Similarly, in terms of EPR4 sampling, the pulse is four clock periods wide at the base and includes five samples, samples 108, 110, 112, 114 and 116. Three of these samples are used for decoding, the sample at the peak of the pulse, sample 112, and the samples at half the peak amplitude, sample 110 and sample 114. Thus, the three nonzero samples have relative amplitudes of 1:2:1.

Partial response signaling may be combined with various techniques for extracting the desired digital data from the sample data of the analog signal. One such technique is known as maximum likelihood (ML) or Viterbi decoding. Viterbi decoding is typically combined with partial response signaling.

FIG. 2a is a block diagram of a prior art PR4 decoding system of a tape or disk drive. The analog read signal from the tape or disk drive is input into a standard $1-D^2$ delay channel 202. The output of delay channel 202 is coupled to a standard PR4 timing system 204. PR4 timing system 204 digitizes and equalizes the analog signal from channel 202 in accordance with well-known Partial Response Class 4 specifications. The output of PR4 timing system 204 is coupled to standard PR4 Viterbi decoder 206. Viterbi decoder 206 converts the digitized samples from PR4 timing system 204 to binary data which is output.

Figure 6:
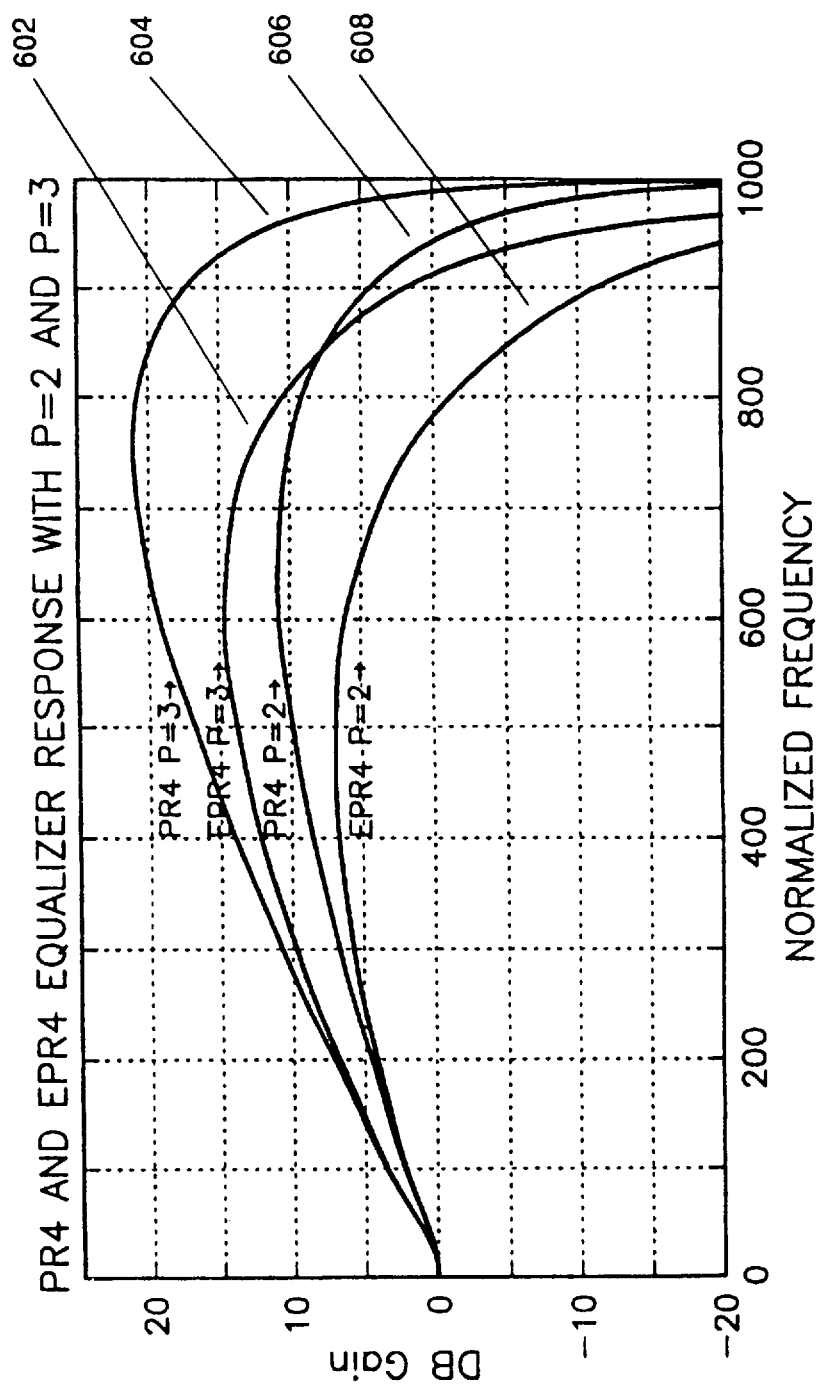
FIG. 6 is a frequency/amplitude plot of the required equalization curves for PR4 and EPR4 equalization.

FIG. 2b is a more detailed block diagram of PR4 timing system 204, which is shown in FIG. 2a. PR4 timing system 204 includes Preamp/Filter 204-1, which amplifies the analog signal from delay channel 202 and filters out extraneous frequency components from the signal. The output of Preamp/Filter 204-1 is coupled to digitizer 204-2, which samples the equalized analog signal in accordance with Partial Response Class 4 timing. The digitized samples are input to PR4 equalizer 204-3. The equalization which is required for PR4 is, as is shown in FIG. 6, very pronounced. In order to perform the required equalization, multiple stages of digital equalization are needed. The output of PR4 equalizer 204-3 is coupled to clock recovery circuit 204-4, which recovers the necessary PR4 sampling clock and outputs the clock back to digitizer 204-2. Circuit 204-4 also outputs the digitized samples to partial Viterbi decoder 214.

FIG. 2c is a block diagram of a prior art PR4 decoding system 210, in which partial Viterbi decoding is used. System 210 includes a standard $1-D^2$ channel 202 and a standard PR4 timing system 204, which is similar to the correspondingly numbered component of the system shown in FIG. 2a. The output of PR4 timing system 204 is coupled to $1-D^2$ operator 212. Operator 212 introduces a two time interval negatively superposed delay in the digitized signal from PR4 timing system 204. The output of operator 212 is coupled to partial Viterbi decoder 214 which converts the digitized samples to binary data, which is output.

Figure 3A:
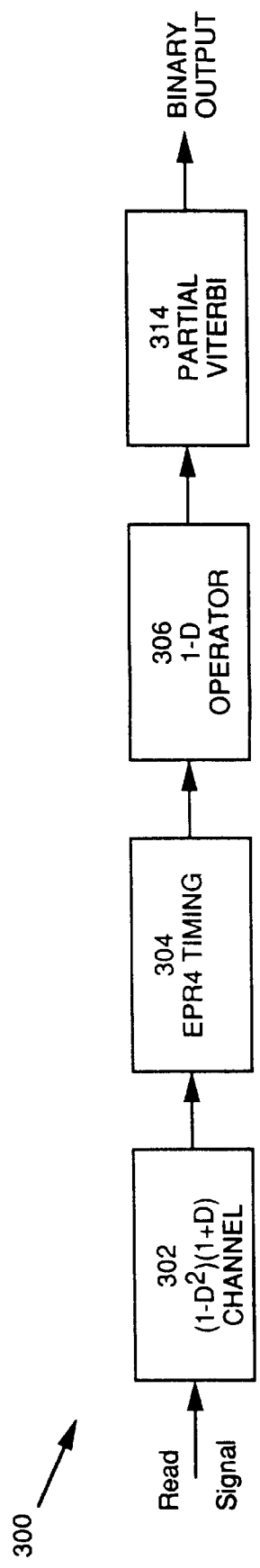
FIG. 3a is a block diagram of a decoding system 300, in accordance with the present invention.

FIG. 3a is a block diagram of a decoding system 300, in accordance with the present invention. System 300 includes a $(1-D^2)(1+D)$ channel 302. The output of channel 302 is coupled to an EPR4 timing system 304. EPR4 system 304 digitizes and equalizes the analog signal from channel 302 in accordance with Extended Partial Response Class 4 specifications. The output of EPR4 timing system 304 is coupled to 1–D operator 306, which introduces a one time interval negatively superposed delay into the digitized signal from EPR4 timing system 304. The output of operator 306 is coupled to partial Viterbi decoder 314 which converts the digitized samples to binary data, which is output.

Figure 3B:
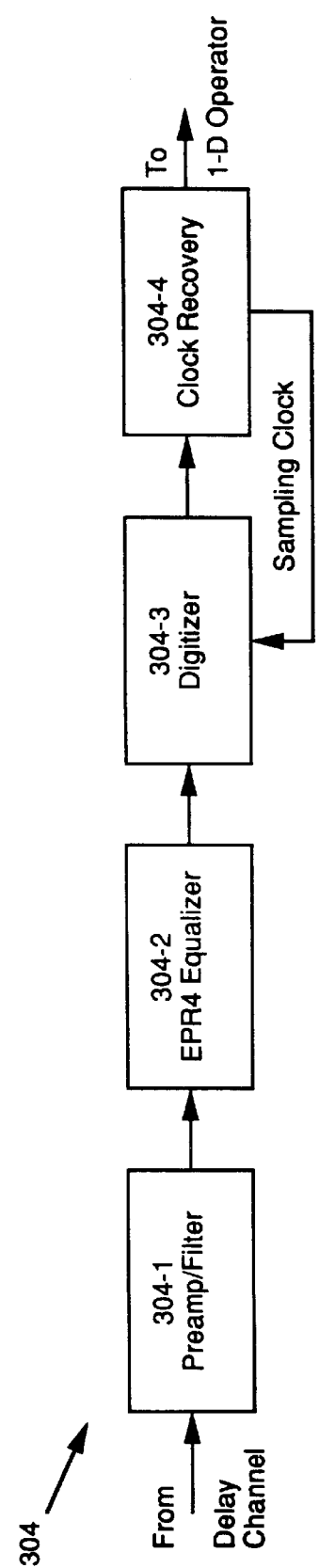
FIG. 3b is a block diagram of the details of one block of FIG. 3a, EPR4 timing system 304.

The decoding systems of FIGS. 2a, 2c and 3a all accept the same input signal and all output the same decoded data signal. However, the systems of FIGS. 2a and 2c contain PR4 timing system 204, which includes a PR4 equalizer, block 204-3 of FIG. 2b. PR4 equalization has a very steep cutoff characteristic, as is shown in FIG. 6 below. This results in PR4 equalizers being expensive, large and complex circuits of considerable power usage. By contrast, the system of FIG. 3a contains an EPR4 equalizer, as is shown in FIG. 3b. As shown in FIG. 6, EPR4 equalization has a much more gentle characteristic, as compared to the PR4 characteristic. Therefore, EPR4 equalizers are smaller and simpler circuits than PR4 equalizers and use much less power.

FIG. 3b is a more detailed block diagram of EPR4 timing system 304, which is shown in FIG. 3a. EPR4 system 304 includes Preamp/Filter 304-1, which amplifies the analog signal from delay channel 302 and filters out extraneous frequency components from the signal. The output of Preamp/Filter 304-1 is coupled to analog EPR4 equalizer 304-2, which filters the frequency spectrum of the signal according to the EPR4 equalization curve. The equalization which is required for EPR4 is, as shown FIG. 6, much gentler than the equalization required for PR4. Therefore, EPR4 equalizer 304-2 is an analog equalizer, which is cheaper, smaller and less complex than the digital equalizer required for PR4 equalization. The output of EPR4 equalizer 304-2 is coupled to digitizer 304-3, which samples the equalized analog signal in accordance with Extended Partial Response Class 4 timing. The digitized samples are input to clock recovery circuit 304-4, which recovers the necessary EPR4 sampling clock and outputs the clock back to digitizer 304-3. Circuit 304-4 also outputs the digitized samples to 1–D operator 306.

Equalization transforms the signal pulses from the disk drive into signal pulses of the shape needed for the decoding circuitry to function properly, such as the signal pulses shown in FIG. 1. Referring briefly to FIG. 1, it is seen that the pulse required for PR4 decoding is narrower than the pulse required for EPR4 decoding. Turning now to FIG. 6, the required equalization curves for PR4 and EPR4 equalizations are shown. PR4 equalization curve 604 is for a pulse width, at 50% of maximum amplitude, of 3 timing intervals, denoted P=3. In order to produce a pulse which is as narrow as needed, it is seen that curve 604 has a very steep cutoff at high frequencies. This steep cutoff means that the PR4 equalization of curve 604 must be implemented by an equalizer, such as block 204-3 of FIG. 2b, which is an expensive, complex and power consuming digital equalizer.

By contrast, in order to produce the wider pulse used in EPR4 decoding, EPR4 equalization curve 602, for P=3, has a much gentler slope which may be implemented by an equalizer, such as block 304-2 of FIG. 3b, which is a simple and relatively low-power analog equalizer. Likewise, the EPR4 equalization curve for P=2, 608, has a much more gentle slope than the PR4 equalization curve for P=2, 606.

The equalizer of block 304-2 of FIG. 3b may be as simple as a three stage analog equalizer. Increasing the number of stages improves the error rate performance of the decoding system. However, increasing the number of stages also increases the cost, complexity and power consumption of the equalizer. In some applications, a three stage equalizer will provide sufficient performance. However, a five stage equalizer is preferred due to its improved performance, despite the increase in cost, complexity and power consumption over the three tap equalizer.

Figure 4:
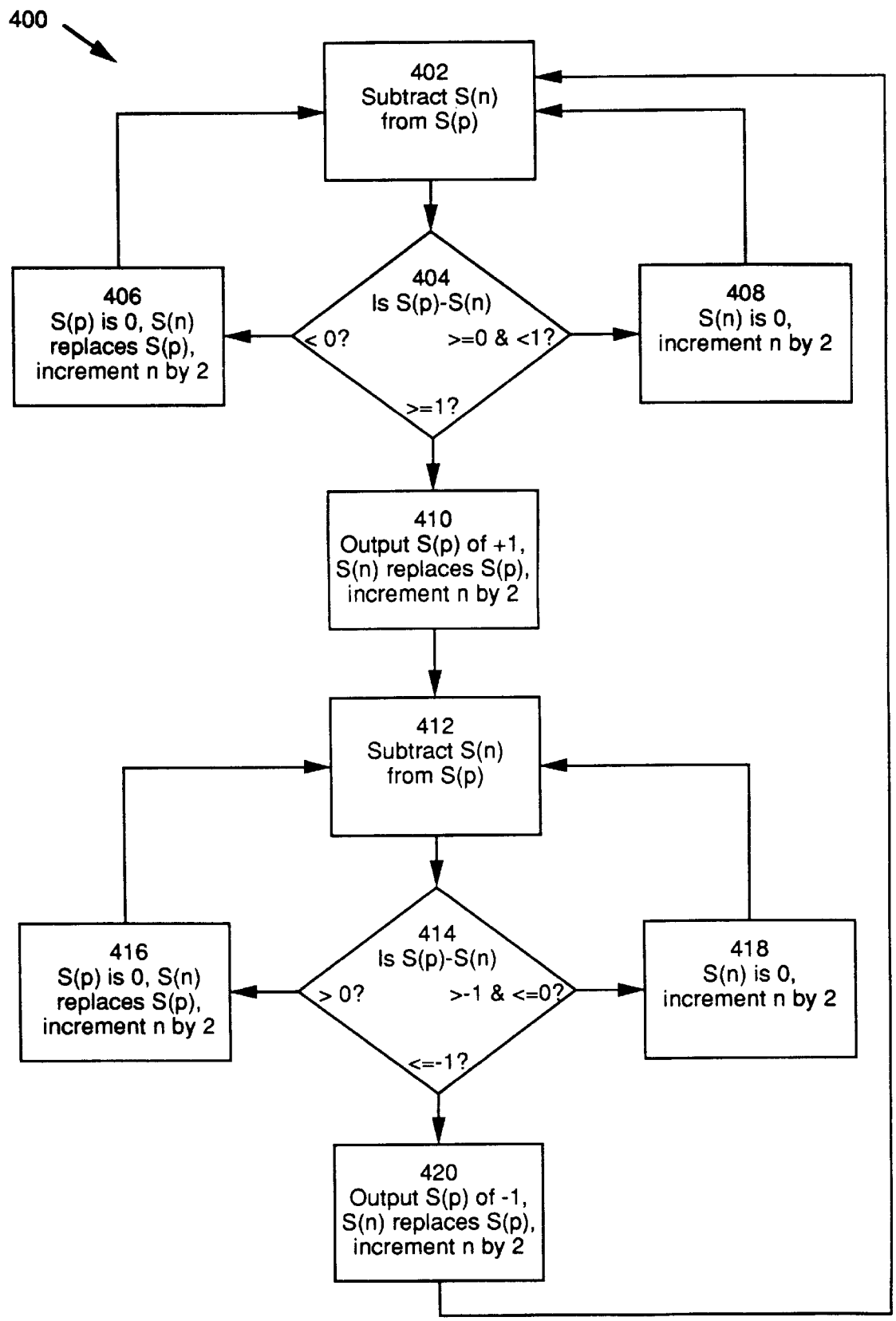
FIG. 4 is a block diagram of a Viterbi decoding process 400.

Turning now to FIG. 4, the Viterbi decoding process 400, which is implemented in block 206 of FIG. 2a, is shown. The PR4 signal is made up of two interleaved sample strings. In each string, a +1 sample must be followed by either 0 or −1 and a −1 sample must be followed by either 0 or +1. For two samples S(n) and S(p), occurring at times p and n, where n=p+2 initially, process 400 examines successive samples to determine their values. The process has two loops, one of which searches for S(p) of +1, steps 402 through 410, the other of which searches for S(p) of −1, steps 412 through 420. Process 400 begins with step 402, in which sample S(n) is subtracted from sample S(p). Step 402 is the entry point of a loop which searches for S(p) of +1. In step 404, the result of the subtraction of step 402 is tested against three conditions. If in step 404, it is found that the result of step 402 is less than zero, this means that S(p) is zero, which is not the value being sought. Therefore, the next set of two samples in the string are to be examined. This is accomplished in step 406, in which S(p) is replaced by S(n) and n is incremented by two. The process then loops to step 402, in which the new values of S(p) and S(n) are operated upon.

If in step 404, it is found that the result of step 402 is greater than or equal to zero and less than one, this means than S(n) is zero. The process goes to step 408, in which n is incremented by two. The process then loops back to step 402.

If in step 404, it is found that the result of step 402 is greater than or equal to +1, this means that S(p) is +1, which is the value being sought. The process goes to step 410, in which an S(p) of +1 is output. S(p) is replaced by S(n) and n is incremented by two. The process then goes to step 412, which is the entry point of a loop which searches for S(p) of −1. In step 412, sample S(n) is subtracted from sample S(p). In step 414, the result of the subtraction of step 412 is tested against three conditions. If it is found that the result of step 412 is greater than zero, this means that S(p) is zero, which is not the value being sought. Therefore, the next set of two samples in the string are to be examined. This is accomplished in step 416, in which S(p) is replaced by S(n) and n is incremented by two. The process then loops to step 412, in which the new values of S(p) and S(n) are operated upon.

If in step 414, it is found that the result of step 412 is greater than one or less than or equal to zero, this means than S(n) is zero. The process goes to step 408, in which n is incremented by two. The process then loops back to step 402.

If in step 414, it is found that the result of step 412 is less than or equal to −1, this means that S(p) is −1, the value being sought. The process goes to step 420, in which an S(p) of −1 is output. S(p) is replaced by S(n) and n is incremented by two. The process then repeats for all additional data by going to step 402, which is the entry point of the loop which searches for S(p) of +1.

The Viterbi decoding process 400 is a function of the difference between two samples, which initially are S(p) and S(n=p+2). Thus, the initial difference is S(p)S(p+2). If step 408 or step 418 are entered, n is incremented by two, but S(p) does not change. Thus, the difference becomes S(p)−S(n=p+2k) where k=2, 3, 4 . . . If steps 410, 416 or 420 are entered, S(n) replaces S(p), n is incremented by two and the difference becomes S(p)−S(p+2).

Figure 5:
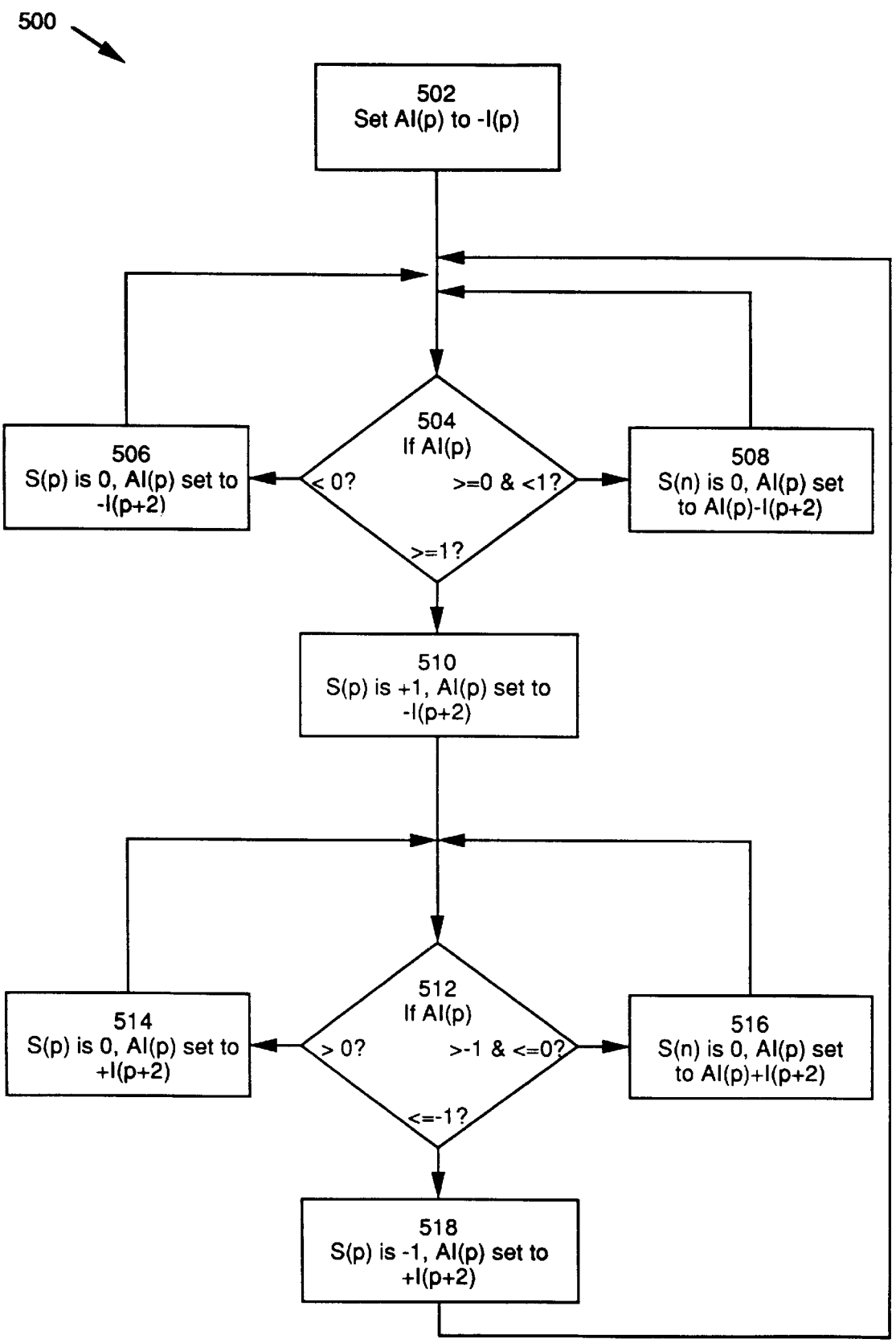
FIG. 5 is a block diagram of a partial Viterbi decoding process 500.

The partial Viterbi decoding process 500, as implemented in block 214 of FIG. 2c and block 314 of FIG. 3a, is shown in FIG. 5. The EPR4 signal is made up of two interleaved sample strings, similar to the PR4 sample string. The partial Viterbi decoding process is the Viterbi decoding process expressed as a function of I(p)=S(p+2)−S(p). Thus, S(p)−S(2+2k)=−(I(p)+I(P+2)+I(+4)+. . .+I(p+2(k−1)). Partial Viterbi decoding process 500 has two loops, one of which searches for S(p) of +1, steps 504 through 510, the other of which searches for S(p) of −1, steps 512 through 518. Process 500 begins with step 502, in which an I accumulator AI(p) is initially set to −I(p). In step 504, AI(p) is tested against three conditions. If in step 504, it is found that AI(p) is less than zero, this means that S(p) is zero, which is not the value being sought. The process goes to step 506, in which AI(p) is set to −I(p+2). The process then loops to step 504, in which the new value of AI(p) is tested again.

If in step 504, it is found that AI(p) is greater than or equal to zero and less than one, this means than S(n) is zero. The process goes to step 508, in which AI(p) is set to AI(p)−I(p+2). The process then loops back to step 504.

If in step 504, it is found that AI(p) is greater than or equal to +1, this means that S(p) is +1, the value being sought. The process goes to step 510, in which an S(p) of +1 is output. AI(p) is set to −I(p+2). The process then goes to step 512, which is the entry point of a loop which searches for S(p) of −1. In step 512, this new value of AI(p) is tested against three conditions. If in step 512, it is found that AI(p) is greater than zero, this means that S(p) is zero, which is not the value being sought. The process goes to step 514, in which AI(p) is set to +I(p+2). The process then loops back to step 512, in which the new value of AI(p) is tested again.

If in step 512, it is found that AI(p) is greater than one and less than or equal to zero, this means than S(n) is zero. The process goes to step 516, in which AI(p) is set to AI(p)+I(p+2). The process then loops back to step 512.

If in step 512, it is found that AI(p) is less than or equal to −1, this means that S(p) is −1, the value being sought. The process goes to step 518, in which an S(p) of −1 is output. AI(p) is set to +I(p+2). The process then repeats for all additional data by going to step 504, which is the entry point of a loop which searches for S(p) of +1.

Although a specific embodiment of the present invention has been described, it will be understood by those of skill in the art that there are other embodiments which are equivalent to the described embodiment. Accordingly, it is to be understood that the invention is not to be limited by the specific illustrated embodiment, but only by the scope of the appended claims.

What is claimed is:

1. An apparatus for decoding a partial response encoded signal to generate a decoded signal comprising:

first delay filter, coupled to receive the partial response encoded signal, generating a first filtered signal filtered with a delay characteristic of $(1-D^2)(1+D)$;

an equalizer, coupled to receive the first filtered signal from the first delay filter, generating an equalized signal equalized in accordance with EPR4 equalization;

a digitizer, coupled to receive the equalized signal from the equalizer, sampling the equalized signal with EPR4 timing and generating a digital signal representative of the first filtered signal;

a second delay filter, coupled to receive the digital signal from the digitizer, generating a second filtered signal filtered with a delay characteristic of 1−D; and a partial Viterbi decoder, coupled to receive to the second filtered signal from the second delay filter, generating the decoded signal by performing the steps of:
  initializing an accumulation resister;
  repeatedly comparing the contents of the accumulation with a first predetermined condition and updating the accumulation register based on the second filtered signal, while contents of the accumulation register do not meet the first predetermined condition;
  generating an output signal, reinitializing the accumulation register, and performing steps (d) and (e), when the contents of the accumulation register meet the first predetermined condition;
  repeatedly comparing the contents of the accumulation register with a second predetermined condition updating the accumulation register based on the second filtered signal, while the contents of the accumulation register do not meet the second predetermined condition; and
  generating an output signal, reinitializing the accumulation register, and repeating steps (b) and (c), when contents of the accumulation register meet second predetermined condition.

2. In a disk drive, a circuit for decoding a partial response encoded signal to generate a decoded signal comprising:

a first delay filter, coupled to receive the partial response encoded signals genera ng a first filtered signal filtered with a delay characteristic of $(1-D^2)(1+D)$;

an equalizer, coupled to receive the first filtered signal from the first delay filter, generating an equalized signal equalized in accordance with EPR4 equalization;

a digitizer, coupled to receive the equalized signal from the equalizer, sampling the equalized signal with EPR4 timing and generating a digital signal representative of the first filtered signal;

a second delay filter, coupled to receive the digital signal from the digitizer, generating a second filtered signal filtered with a delay characteristic of 1−D; and a partial Viterbi decoder, coupled to receive to the second filtered signal from the second delay filters generating the decoded signal by performing steps of:

initializing an accumulation register;

repeatedly comparing the contents of the accumulation register with a first predetermined condition and updating the accumulation register based on the second filtered signal, while the contents of the accumulation register do not meet the first predetermined condition;

generating an output signal reinitializing the accumulation register, and performing steps (d) and (e), when the contents of the accumulation register meet the first predetermined condition;

repeatedly comparing the contents of the accumulation register with a second predetermined condition updating the accumulation register based on the second filtered signal, while the contents of the accumulation register do not meet the second predetermined condition; and generating an output signal, reinitializing the accumulation register, and repeating steps (b) and (c), when the contents of the accumulation register meet the second predetermined condition.

3. A method for decoding a partial response encoded signal to generate a decoded signal comprising:

filtering the partial response encoded signal with a delay characteristic of $(1-D^2)(1+D)$ to generate a first filtered signal;

equalizing the first filtered signal in accordance with IPR4 equalizations to general an equalized signal;

digitizing the equalized signal from the equalizer by sampling the equalized signal with EPR4 timing and generating a digital signal representative of the first filtered signal;

filtering the digital signal with a delay characteristic of 1−D to generate a second filtered signal; and decoding the second filtered signal with a partial Viterbi decoder to generate the decoded signal by performing the steps of:

initializing an accumulation register;

repeatedly comparing the contents of the accumulation register with a first predetermined condition and updating the accumulation register based on the second filtered signal, while the contents of the accumulation register do not meet the first predetermined condition;

generating an output signal, reinitializing the accumulation register, and performing steps (d) and (e), when the contents of the accumulation the first predetermined condition;

repeatedly comparing the contents of the accumulation register with a second predetermined condition updating the accumulation register based on the second filtered signal, while the contents of the accumulation register do not meet the second predetermined condition; and generating an output signal, reinitializing the accumulation register, and repeating steps (b) and (c), when the contents of the accumulation register meet the second predetermined condition.

4. An apparatus for decoding a partial response encoded signal to generate a decoded signal comprising:

a first delay filter, coupled to receive the partial response encoded signal, generating a first filtered signal filtered with a delay characteristic of $(1-D^2)(1+D)$;

a timing system, coupled to receive the first filtered signal from the first delay filter, generating a digital signal representative of the first filtered signal;

a second delay filter, coupled to receive the digital signal from the timing system, generating a second filtered signal filtered with a delay characteristic of 1−D; and a partial Viterbi decoder, coupled to receive to the second filtered signal from the second delay filter, generating the decoded signal by performing the steps of:

(a) initializing an accumulation register;

(b) repeatedly comparing the contents of the accumulation register with a first predetermined condition and updating the accumulation register based on the second filtered signal, while the contents of the accumulation register do not meet the first predetermined condition;

(c) generating an output signal, reinitializing the accumulation register, and performing steps (d) and (e), when the contents of the accumulation register meet the first predetermined condition;

(d) repeatedly comparing the contents of the accumulation register with a second predetermined condition updating the accumulation register based on the second filtered signal, while the contents of the accumulation register do not meet the second predetermined condition; and (e) generating an output signal, reinitializing the accumulation register, and repeating steps (b) and (c), when the contents of the accumulation register meet the second predetermined condition.

5. In a disk drive, a circuit for decoding a partial response encoded signal to generate a decoded signal comprising:

a first delay filter, coupled to receive the partial response encoded signal, generating a first filtered signal filtered with a delay characteristic of $(1-D^2)(1+D)$;

a timing system, coupled to receive the first filtered signal from the first delay filter, generating a digital signal representative of the first filtered signal;

a second delay filter, coupled to receive the digital signal from the timing system, generating a second filtered signal filtered with a delay characteristic of 1−D; and a partial Viterbi decoder, coupled to receive to the second filtered signal from the second delay filter, generating the decoded signal by performing the steps of:

(a) initializing an accumulation register;

(b) repeatedly comparing the contents of the accumulation register with a first predetermined condition and updating the accumulation register based on the second filtered signal, while the contents of the accumulation register do not meet the first predetermined condition;

(c) generating an output signal, reinitializing the accumulation register, and performing steps (d) and (e), when the contents of the accumulation register meet the first predetermined condition;

(d) repeatedly comparing the contents of the accumulation register with a second predetermined condition updating the accumulation register based on the second filtered signal, while the contents of the accumulation register do not meet the second predetermined condition; and (e) generating an output signal, reinitializing the accumulation register, and repeating steps (b) and (c), when the contents of the accumulation register meet the second predetermined condition.

6. A method for decoding a partial response encoded signal to generate a decoded signal comprising:

filtering the partial response encoded signal with a delay characteristic of $(1-D^2)(1+D)$ to generate a first filtered signal;

generating a digital signal representative of the first filtered signal;

filtering the digital signal with a delay characteristic of 1−D to generate a second filtered signal; and decoding the second filtered signal with a partial Viterbi decoder to generate the decoded signal by performing the steps of:

(a) initializing an accumulation register;

(b) repeatedly comparing the contents of the accumulation register with a first predetermined condition and updating the accumulation register based on the second filtered signal, while the contents of the accumulation register do not meet the first predetermined condition;

(c) generating an output signal, reinitializing the accumulation register, and performing steps (d) and (e), when the contents of the accumulation register meet the first predetermined condition;

(d) repeatedly comparing the contents of the accumulation register with a second predetermined condition updating the accumulation register based on the second filtered signal, while the contents of the accumulation register do not meet the second predetermined condition; and (e) generating an output signal, reinitializing the accumulation register, and repeating steps (b) and (c), when the contents of the accumulation register meet the second predetermined condition.

* * * * *